(12) United States Patent
Lungu

(10) Patent No.: US 8,271,314 B2
(45) Date of Patent: Sep. 18, 2012

(54) SYSTEM AND METHOD OF REAL-TIME HOMEBUILDING SCHEDULING

(75) Inventor: Sorin Lungu, North York (CA)

(73) Assignee: Constellation HomeBuilder Systems Inc., Markham (CA)

( * ) Notice: Subject to any disclaimer, the term of this patent is extended or adjusted under 35 U.S.C. 154(b) by 688 days.

(21) Appl. No.: 12/178,187

(22) Filed: Jul. 23, 2008

(65) Prior Publication Data

US 2009/0182600 A1 Jul. 16, 2009

(30) Foreign Application Priority Data

Jul. 24, 2007 (CA) ...................................... 2594639

(51) Int. Cl.
*G06Q 10/00* (2012.01)
(52) U.S. Cl. ............. 705/7.23; 705/1; 705/26; 705/400; 707/104.1; 715/738
(58) Field of Classification Search .................. 705/7, 1, 705/26, 22, 7.23; 707/104.1
See application file for complete search history.

(56) References Cited

U.S. PATENT DOCUMENTS

| | | | | |
|---|---|---|---|---|
| 7,627,658 | B2 * | 12/2009 | Levett et al. .................. | 709/223 |
| 2003/0033179 | A1 * | 2/2003 | Katz et al. .......................... | 705/7 |
| 2003/0106039 | A1 * | 6/2003 | Rosnow et al. ............... | 717/100 |
| 2004/0225571 | A1 * | 11/2004 | Urali ............................... | 705/26 |
| 2005/0005259 | A1 * | 1/2005 | Avery et al. .................... | 717/103 |
| 2005/0256735 | A1 * | 11/2005 | Bayne ............................... | 705/1 |
| 2006/0058902 | A1 * | 3/2006 | Yeh et al. ......................... | 700/96 |
| 2006/0171402 | A1 * | 8/2006 | Moore et al. .................. | 370/401 |
| 2007/0209059 | A1 * | 9/2007 | Moore et al. ....................... | 726/2 |

* cited by examiner

*Primary Examiner* — Vanel Frenel
(74) *Attorney, Agent, or Firm* — McMillan LLP

(57) ABSTRACT

The invention consists of a method of real-time tracking of production schedules and timetables for one or more homebuilding developments, comprising: a) assigning one or more mobile devices to one or more users associated with projects and lots, the mobile devices providing access to project and lot information, including: lots for completion for each project, tasks for completion for each lot, assignment of suppliers and material to specific tasks, projected and actual times for completion of tasks, contact information for suppliers and invoicing information for payment of purchase orders upon task completion; and each mobile device capable of operating independently without a continuous connection to a central system; b) tracking performance of production tasks for each project via real-time monitoring by the users; c) reporting task performance data to a central ERP system and comparing real-time performance of the production tasks to scheduled timetables for the production tasks; d) enabling modification and updating of scheduled timetables for production tasks based on performance data for the production tasks and additional real-time input from the individuals; e) coordinating compensation for production activities with the performance data, including enabling payment for completed tasks from the mobile devices via purchase orders; f) synchronizing, on a sequential basis, updates to scheduled timetables and other information between the mobile devices and the ERP system.

20 Claims, 11 Drawing Sheets

```
Constellation OnLocation
Vic Cizmarik
Schedule Information
    Projects: 2
    Lots: 10 (9 behind, 0 ahead)
    Tasks: 485
Closings
    This week: 0
    This month: 0
Synchronization Information
    Records to Update: 0
    Task Masters: 92
    Suppliers: 51
        Contacts: 4
    Buyers: 10
    Lot Options: 333
    POs: 340
    Last Sync:          04/20/2007 1:16 PM
```

Figure 2

```
Garage Door
TK-110-Muncie Production Region-
04-0107
Actual:
Start:                       Tue - 07/10/07
Add End Date
Revised:
Start:                       Mon - 06/18/07
End:                         Thu - 06/28/07
Planned:
Start:                       Sat - 02/19/05
```

Figure 4E

```
Garage Door
TK-110-Muncie Production Region-
04-0107
Actual:
Start:                       Tue - 07/10/07
Add End Date
Revised:
Start:                       Mon - 06/18/07
End:                         Thu - 06/28/07
Planned:
Start:                       Sat - 02/19/05
```

Figure 4F

Garage Door
TK-110-Muncie Production Region-
04-0107
Actual:
Start:                          Tue - 07/10/07
End:                            Wed - 07/11/07
Revised:
Start:                          Mon - 06/18/07
End:                            Thu - 06/28/07
Planned:
Start:                          Sat - 02/19/05
End:                            Wed - 03/02/05

TK-110-Muncie | Help
04-0057      | Flag Item
04-0107-     | Update Schedule
04-0115-     | Hold Schedule
04-0173-     | View Tasks
04-0180-     | View Lot Details
             | View Lot Options
             | View Suppliers
             | View Today
             | View Flagged
             | View Completed Tasks
             | Clear New OnLocation Options
Web Service URL:
http://ol.constellationhb.com/scripts/
cgiip.exe/WService=TK_Newstar/
util/webdispatcher.p
   Update Frequency in minutes: 
User Settings
   Default Screen:            Summary
   Require Revision Reason: yes
   Allow Schedule Hold: yes
   Get Application Update: yes
WAP Settings

SYSTEM AND METHOD OF REAL-TIME HOMEBUILDING SCHEDULING

FIELD OF THE INVENTION

The present invention relates to the field of real-time scheduling management. In particular, it relates to wireless, mobile, real-time workflow and scheduling for building, particularly homebuilding.

BACKGROUND OF THE INVENTION

Homebuilders, particularly those who are required to simultaneously manage numerous construction sites, are continually searching for methods of improving efficiency in managing these sites and monitoring workflow. In particular, the need to manage and monitor numerous different suppliers, which may also include contractors, sub-contractors and tradespeople, and to coordinate schedules amongst these parties, represents a significant cost in both time and money.

Project management is essential to ensuring that the homebuilding operation proceeds smoothly. At each construction site, different suppliers need to be coordinated to ensure that jobs are completed to the proper standard, house completion deadlines are met, and budgets are kept in control. Each job needs to be verified for quality and confirmed as completed so that payment for the job can be executed, typically by purchase order, or placed on hold. As the homebuilder becomes responsible for multiple construction sites, hereinafter referred to as projects, each project comprised of numerous houses, hereinafter referred to as lots, with each lot comprised of different jobs, hereinafter referred to as tasks, all running simultaneously, the amount of management overhead required can quickly overwhelm profit margins and make the business operation impractical.

The preferred lots are home constructions associated with the project, a construction site and can be identified by the addresses of the homes. Tasks are materials associated with the lots, such as tiles for a kitchen floor, and can contain the specific task supplier information, if necessary. The tasks cover the assignments of the suppliers, and are organized based on the lot production schedule. For example, the task of tiling the kitchen floor is assigned to a specific supplier and a lot, which belongs to a specific project, and given a projected start date and end date based on the lot construction timetable. The same task would include the detailed task information for the tiles, purchase order information for the tiles (if applicable) and the supplier information for the task.

Products have been developed to attempt to address this need, such as BUILDPRO™ by Hyphen Solutions, however, they are based on centralized or web-based applications, requiring an active Internet connection for ongoing operation. As many projects are in locations that receive intermittent or no Internet access, a product is needed that can be provided as an application on a mobile device, eliminating the need for a continuous, active Internet connection.

As a related issue, current products rely on one-time or "data dump" synchronization. That is, the synchronization between the user units and the central ERP (Enterprise Resource Planning) system occurs once a day, usually at a scheduled time, such as midnight. By transferring all the synchronization data at once, substantial transfer bandwidth is required, necessitating both a substantial Internet connection, as well as time to complete the data transfer. Furthermore, there is a possibility of conflicting updates, as the users only receive updated data on a daily basis. Thus, there is a need for a system that provides synchronization is a manner which reduces bandwidth requirements, as well as reducing the risk of conflicting updates.

There is a need for a project management system that reduces the project management effort, reduces paperwork and data input and reduces financial costs while providing improved ability to meet closing dates, oversee suppliers, and increase the number of projects, lots, and tasks that can be managed simultaneously.

It is an object of this invention to partially or completely fulfill one or more of the above-mentioned needs.

SUMMARY OF THE INVENTION

The invention consists of a system for real-time synchronization of work teams and materials for homebuilding developments, comprising: a) an ERP system containing information for projects, including: lots for completion for each project, tasks for completion for each lot, assignment of work teams and material to specific tasks, projected and actual times for completion of tasks, and invoicing information for payment upon task completion; b) a web server enabling communication between the ERP system and mobile devices, and enabling the mobile devices to send, receive and change information in the ERP system in real-time; c) one or more mobile devices assigned to one or more individuals for real-time tracking and recording of production and work status information for the work teams and real-time transmission and intermittent synchronization of updated information to and from the ERP system, and also enabling communication with parties assigned to a task directly from a task list or individual task display; d) one or more software applications coordinating communication, data transmission, synchronization and security for the mobile devices, the web server and the ERP system; where the mobile devices are capable of independent operation from the ERP system and do not require a continuous connection to the ERP system or the web server.

The invention further consists of a method of real-time tracking of production schedules and timetables for one or more homebuilding developments, comprising: a) assigning one or more mobile devices to one or more users associated with projects and lots, the mobile devices providing access to project and lot information, including: lots for completion for each project, tasks for completion for each lot, assignment of suppliers and material to specific tasks, projected and actual times for completion of tasks, contact information for suppliers and invoicing information for payment of purchase orders upon task completion; and each mobile device capable of operating independently without a continuous connection to a central system; b) tracking performance of production tasks for each lot via real-time monitoring by the users; c) reporting task performance data to a central ERP system and comparing real-time performance of the production tasks to scheduled timetables for the production tasks; d) enabling modification and updating of scheduled timetables for production tasks based on performance data for the production tasks and additional real-time input from the individuals; e) coordinating compensation for production activities with the performance data, including enabling payment for completed tasks from the mobile devices via purchase orders; f) synchronizing, on a sequential basis, updates to scheduled timetables and other information between the mobile devices and the ERP system.

The sequential synchronization can take place by triggering from the user, or on an automatic basis, recurring at regular intervals (30 to 480 minutes).

Other and further advantages and features of the invention will be apparent to those skilled in the art from the following detailed description thereof, taken in conjunction with the accompanying drawings.

BRIEF DESCRIPTION OF THE DRAWINGS

The invention will now be described in more detail, by way of example only, with reference to the accompanying drawings, in which like numbers refer to like elements, wherein:

FIG. 2 is a screen shot illustrating the summary screen of the user interface for the system;

FIG. 4E is a screen shot illustrating the task update screen;
FIG. 4F is a screen shot illustrating the task update screen.

DETAILED DESCRIPTION OF THE PREFERRED EMBODIMENTS

Figure 1:
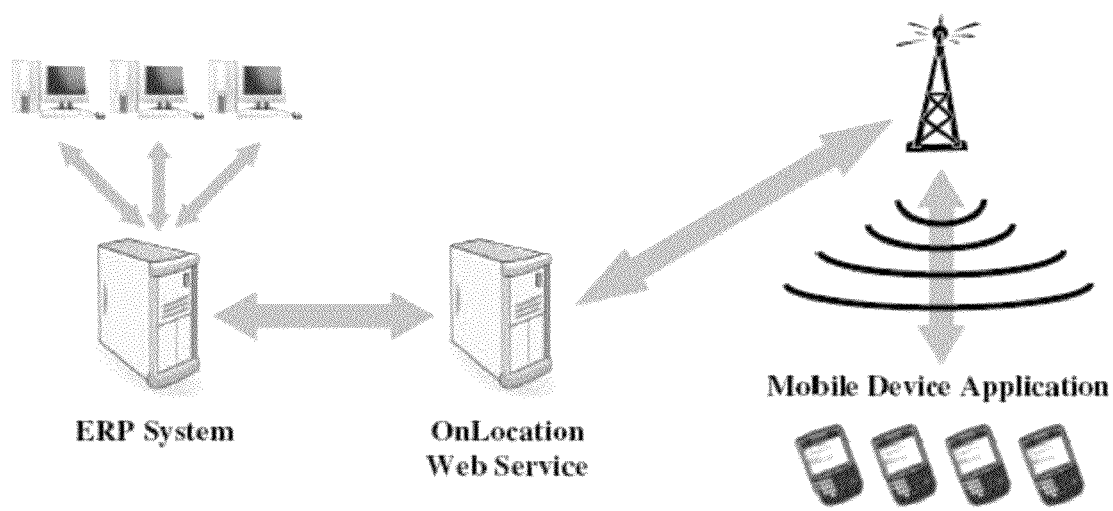
FIG. 1 is an illustration of the homebuilding scheduling system according to the present invention.
Figure 3A:
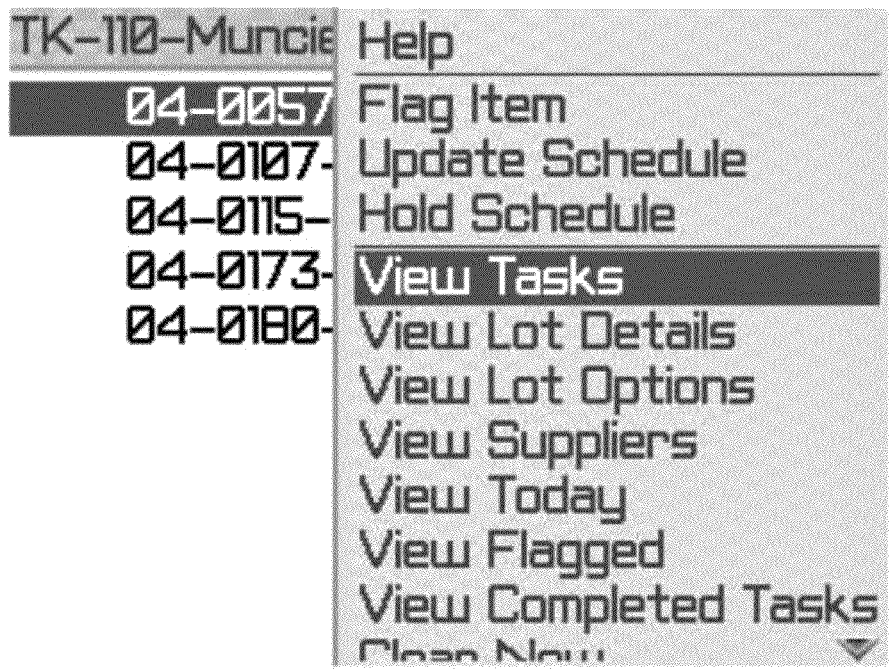
FIG. 3A is a screen shot illustrating the task viewing screen.
Figure 3B:
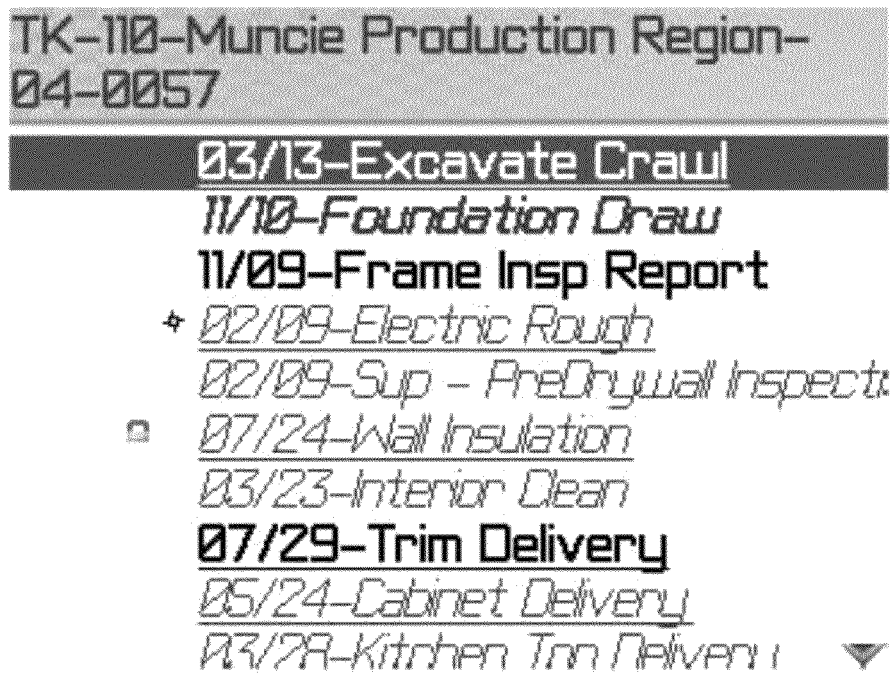
FIG. 3B is a screen shot illustrating the task viewing screen.
Figure 3C:
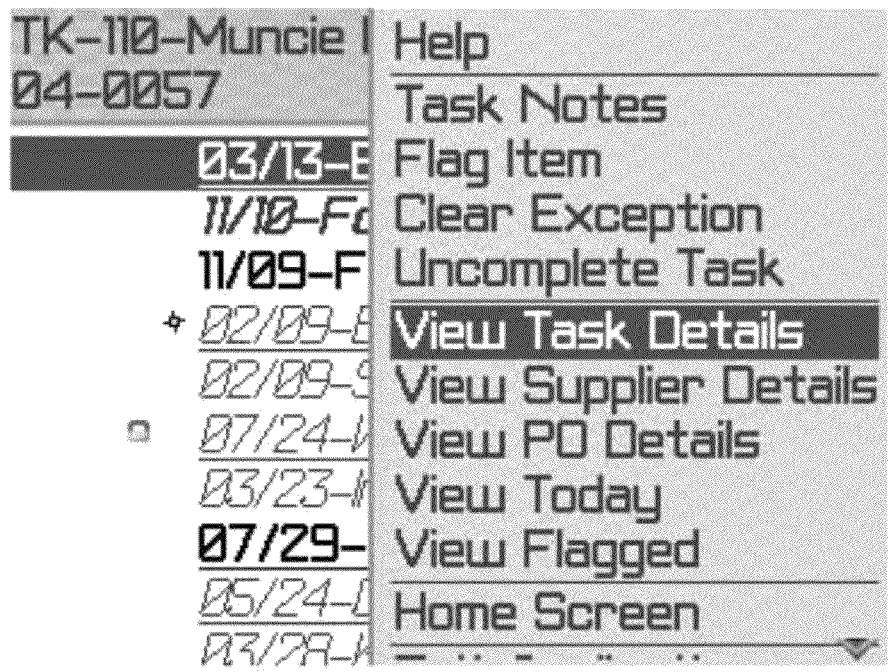
FIG. 3C is a screen shot illustrating the task viewing screen.
Figure 3D:
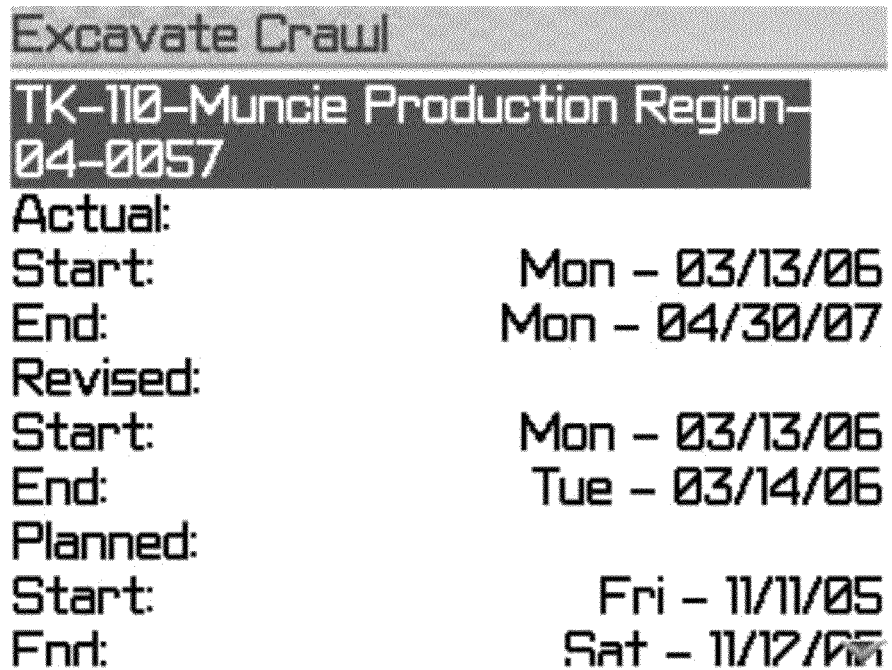
FIG. 3D is a screen shot illustrating the task viewing screen.
Figure 4A:
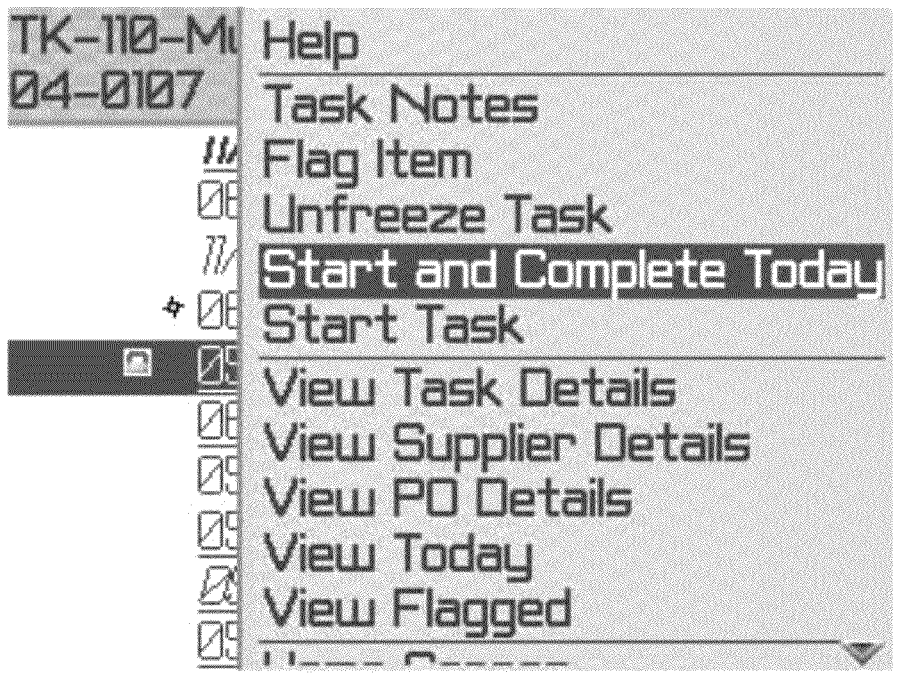
FIG. 4A is a screen shot illustrating the task update screen.
Figure 4B:
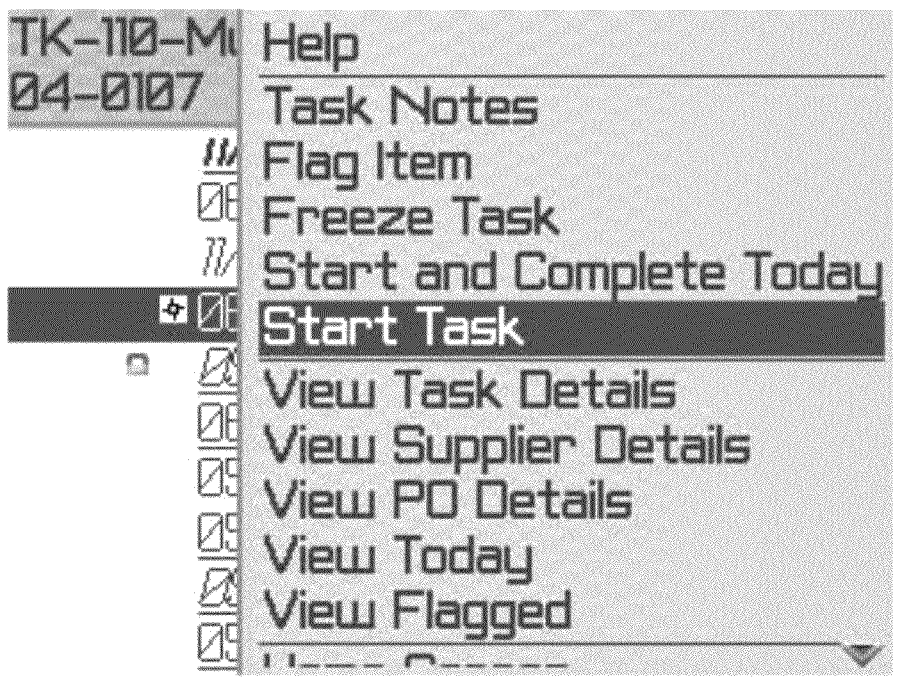
FIG. 4B is a screen shot illustrating the task update screen.
Figure 4C:
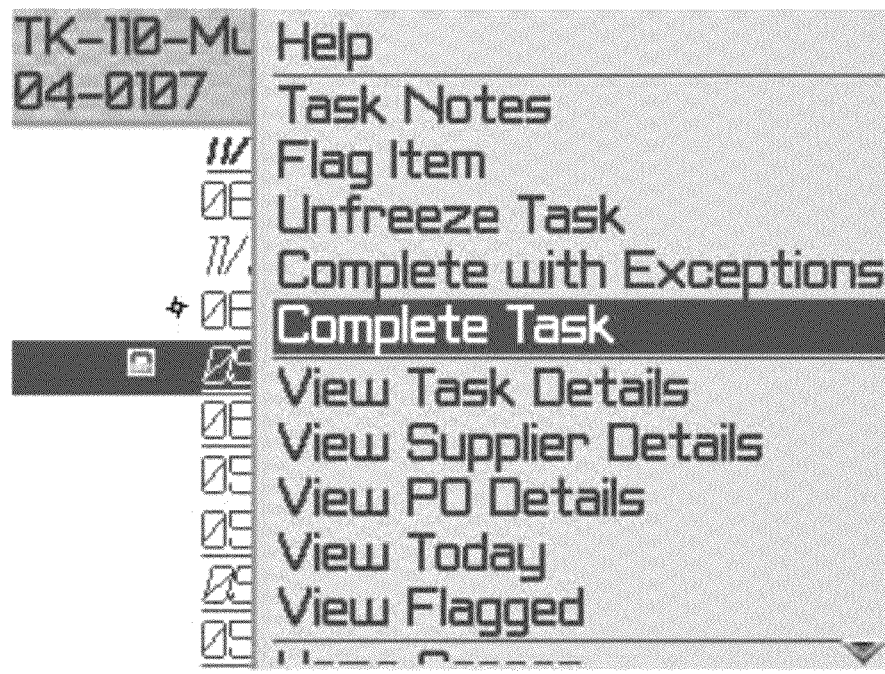
FIG. 4C is a screen shot illustrating the task update screen.
Figure 4D:
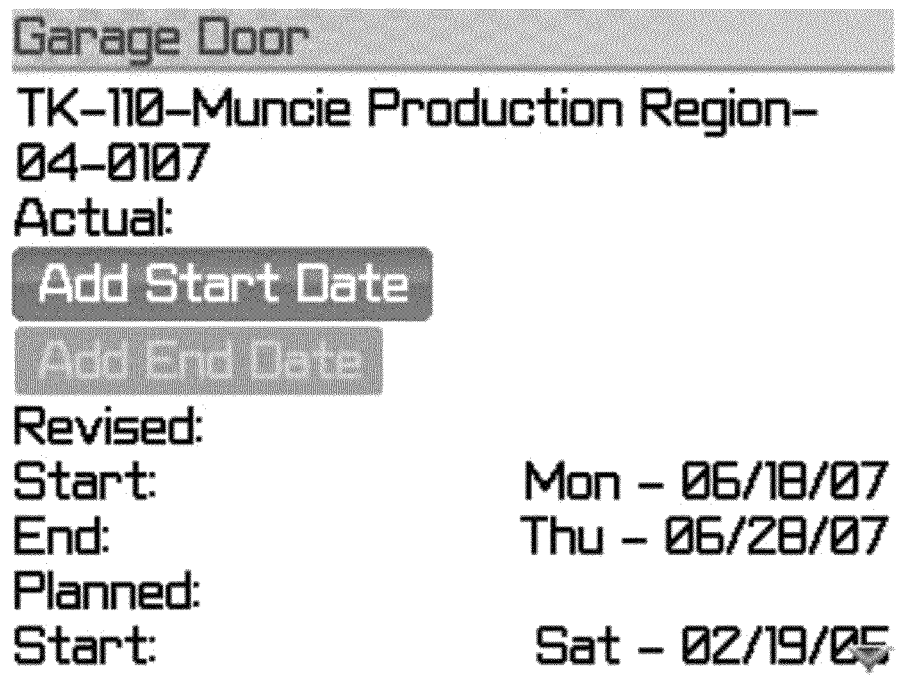
FIG. 4D is a screen shot illustrating the task update screen.
Figures 4G, 5A:
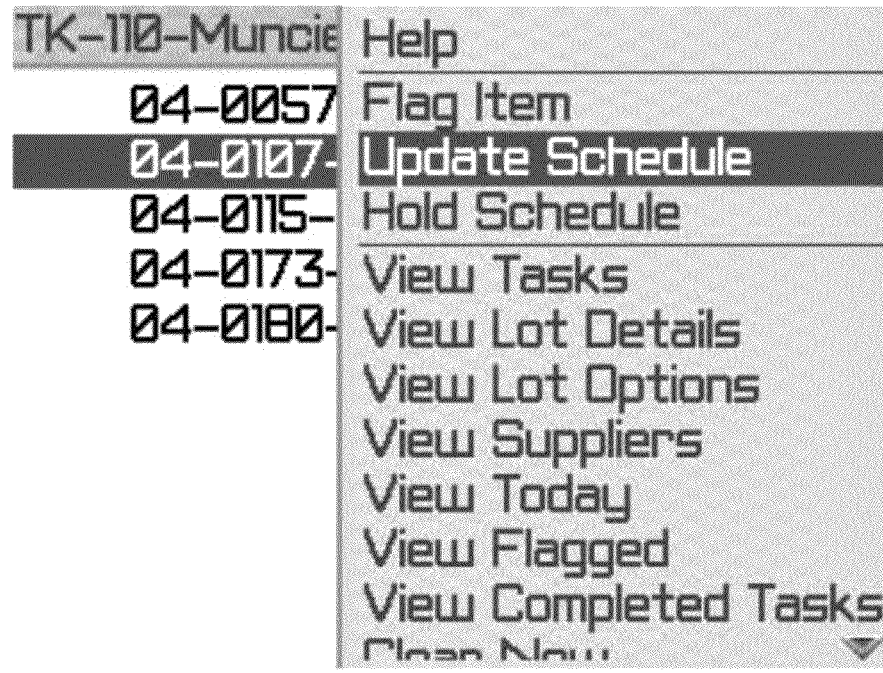
FIG. 4G is a screen shot illustrating the task update screen.
FIG. 5A is a screen shot illustrating the synchronization screen.
Figure 5B:
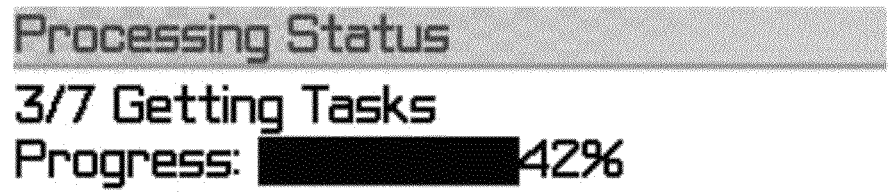
FIG. 5B is a screen shot illustrating the synchronization screen.
Figure 5C:
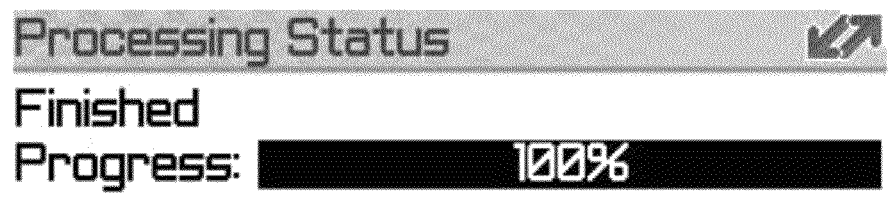
FIG. 5C is a screen shot illustrating the synchronization screen.
Figure 5D:
FIG. 5D is a screen shot illustrating the synchronization screen.

The inventive system presented herein consists of a wireless, real-time scheduling system for homebuilding that permits the collection and distribution of information from any location by any employee. The system consists of at least three components as shown in FIG. 1: an ERP (Enterprise Resource Planning) system to store the data necessary for operation of the system, a web server to run a web service (such as OnLocation) for system communications and data transfer, and one or more mobile devices, such as a BlackBerry™, with an on-board application to interact with the web service and the ERP system. The system enables mobile devices to share scheduling, and purchase order information with the ERP system and makes the operation of multiple projects, lots and tasks more efficient.

The system also includes one or more software applications as necessary to enable communication and data-sharing between the components, particularly synchronization between the mobile device and the ERP system. As noted above, the primary application is resident on the mobile device, permitting the device to operate independent of the ERP system and web server. This also means the mobile device can be used when no Internet access is available, a common occurrence on projects.

The ERP system includes a database, which contains all the information related to the projects, lots tasks and suppliers. This data includes contact information for suppliers, purchase order information, and all other information that is required to create and maintain the construction schedules monitored by the ERP system. The mobile devices are then able to access this information from the database as required, eliminating the need for storage on the mobile device.

As applicable, the system and/or a method of executing the instructions for the system can be provided as computer-executable instructions on a computer-readable storage medium. In this context, computer-readable storage medium includes, but is not limited to, physical media, such a as CDs, DVDs and flash (solid-state) drives, as well as permanent or temporary media, such as computer ROM, computer RAM, and digital delivery services, either as a single file, or as a multi-file, multi part file sharing service (e.g. BitTorrent).

Synchronization

There are two types of synchronization used by the system, an initial "deep" synchronization, and the subsequent ongoing sequential synchronization. The deep synchronization initially transfers all the information related to projects, lots, tasks, suppliers, customers, employees and other categories that are tracked by the system to the mobile device. The ongoing sequential synchronization is then limited to transferring information related to those categories and elements that have changed since the previous synchronization. Thus, the use of sequential synchronization keeps the amount of information transferred to a minimum, reducing the network and bandwidth requirements for the system.

Ongoing synchronization can be manually activated by the individual, be automatically initiated by the mobile device (e.g. every 30 to 480 minutes), or a combination thereof. Preferably, synchronization occurs at regular intervals, such as 30 minutes or multiples thereof, up to maximum synchronization period of only once per eight-hour shift (e.g. 480 minutes). The synchronization period is set to keep bandwidth traffic to a minimum, however, the ability to trigger an immediate synchronization should be provided to the user to allow last-minute and important changes to be propagated throughout the system as rapidly as possible.

Tasks

The system is task-based, defining each project and directly lot item as a task and operating on records of task initiation and completion. A typical project will contain several lots and hundreds of tasks. Each task contains detailed information pertaining to that task, including the start date (real and projected), end date (real and projected), completion status, assigned lot(s) and assigned supplier. Purchase order information is also included as part of the task, as necessary, although it is downloaded to the device on-demand, and only stored on the ERP system. The initial task information is set out at the start of the project, specifically a lot, and is modified to reflect actual lot progress and completion either by the mobile employee supervising the tasks, or at the main server. Changes to the tasks are then recorded and sent out as part of the synchronization process. The addition of new projects and lots can require deep synchronization, due to the amount of data transfer involved.

On a homebuilding project, different stages specific to lots can be defined as tasks (e.g. foundation, framing, wiring, plumbing, etc.) and can then broken down in greater detail, by room, by supplier, or whatever other category is best suited to reflect progress on the tasks and enable proper tracking.

Preferably, each task is assigned to a supplier, who is the party responsible for the completion of the task. On a homebuilding project the supplier is typically a contractor, subcontractor or tradesperson. Lots can also be assigned tasks, which are then tracking materials allocated to the lot (e.g. floor tiles). The lots also have suppliers, the party responsible for providing the materials. The task entry is further linked to the contact information for the suppliers, so that the user can initiate communication (phone, email, text message, etc.) on the mobile device directly from the task display.

Summary Screen

The system interface is based off a summary screen on the mobile device as shown in FIG. 2, providing an at-a-glance summary of all current information, as well as enabling direct access to the different categories via a drop-down menu. The fields used in the summary screen are: Projects—the projects assigned to the individual; Lots—the lots assigned to the individual; Tasks—the number of tasks associated with the Projects and Lots. Further information can include the number of Lots closing this Week or this Month, Suppliers and their contacts associated with the Tasks, Buyers associated with the Lots, Lot Options associated with the Lots, Purchase Orders associated with the Tasks, and the date and time of the last synchronization, as well as the number of changed items since the last synchronization.

From the summary screen, also via the drop-down menu, the user can then navigate through and access a list of Projects, Lots, Completed Lots, Lot Details, Buyer Details, Lot Options, Tasks, Completed Tasks, Suppliers, Purchase Order details, perform synchronization and generally engage in any project tracking/recording activity which they have been assigned to monitor and application functionally available in the ERP system.

View Tasks

The most commonly used display is the task listing, which displays the tasks in the lot, belonging to a specific project. The list can be filtered to exclude completed tasks, restricted to list only those tasks in progress on a specific date (typically that day), and sorted to show flagged tasks of high priority. From this list, tasks can be marked as completed, have notes added, have a priority flag added or removed, or have further details shown about the task, the associated supplier, or the purchase order allocated to the task. Preferably, the most commonly used options (in progress, flagged) are provided as separate display options for ease of use. The series of screen shot in FIGS. 3A-3D show the process of selecting a task and viewing task details.

The preferable configuration is to break the tasks into to-do lists, one for the current day, one for the next day, and one for tasks in progress. This setup enables at-a-glance assessment of tasks status and allows the user to prioritize their monitoring and updating of the task schedule.

Update/Create Tasks

The initial task list for the project is preferably generated at the ERP system side and then sent to the mobile devices during synchronization. However, as the homebuilding project progresses, in addition to modifying start/end times for tasks, it can be necessary to add new tasks, either due to omission from the original list, or as becoming necessary due to changes in the production schedule.

The task display interface on the ERP system side provides the user with the ability to enter new tasks, and link them to existing lots and suppliers, as required. Task creation access is generally not advised, while production schedules are in progress, but can be created solely from the ERP system side. The series of screen shots in FIGS. 4A-4G show the different aspects of task viewing and updating.

Daily Task Updates and Tracking

The user, typically a site superintendent or project manager, is preferably the person responsible for physically monitoring task completion on the project. Thus, as the user conducts a review of ongoing tasks at the job site, they record the progress information on the task list. Information can be recorded as notes, and flags set and actual start/end dates modified in real-time to reflect the actual work progress. This information is then shared via the synchronization process with the ERP system, allowing multiple individuals on a single job site and/or multiple job sites to be coordinated from a single central hub.

By providing a mobile device for data input, the user is able to more rapidly act in response to problems on-site, and is further present on site much more often than if they are required to return to an office or other fixed location to provide updates. Additionally, by having real-time updates to the production schedule at hand, the on-site user is granted greater flexibility in the task management process, enabling them to negate or minimize potential delays arising from other areas of the project.

System Updates

As discussed above, updates to tasks and other project information (e.g. supplier contact information) are exchanged between the mobile device and the ERP system during the normal sequential synchronization process. More substantive updates, such as the addition of a new project and lot, can require a new deep synchronization. Software updates can also be included as part of the synchronization process, but can additionally require a reboot or reset of the mobile device, based on the software update requirements. Screen shots in FIGS. 5A-5D illustrate the synchronization process.

Purchase Orders

Figure 6A:
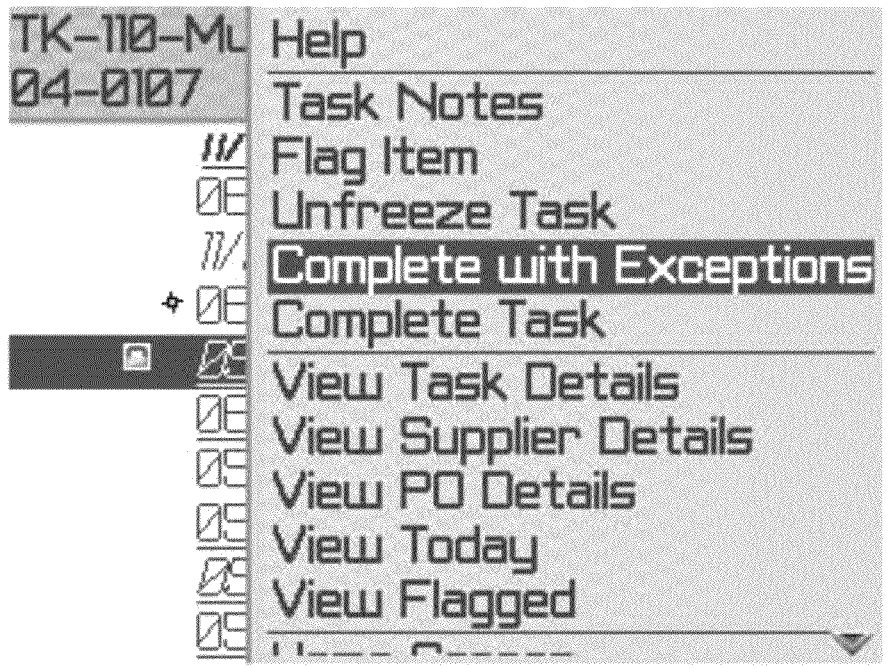
FIG. 6A is a screen shot illustrating the purchase order screen.
Figures 6B, 6C:
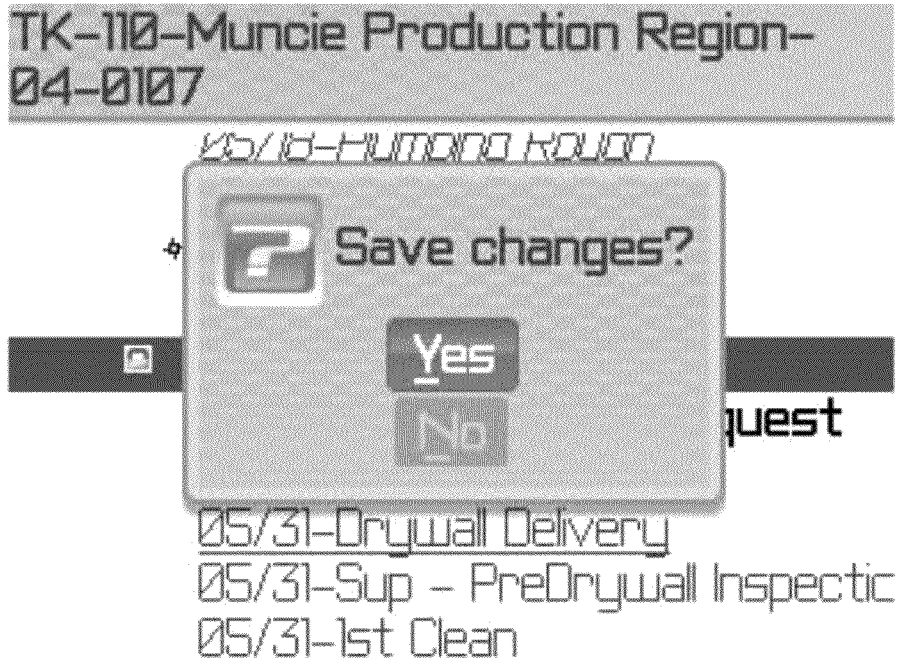
FIG. 6B is a screen shot illustrating the purchase order screen.
FIG. 6C is a screen shot illustrating the purchase order screen.

For security purposes, purchase orders (POs) are handled in two parts. First, the general PO information (number, order date and supplier name) is transferred as part of the synchronization to coordinate with the task list. When the PO is to be completed, the second, more detailed set of information (product codes, quantities and measures, and other lien items) is downloaded on-demand by the user. Thus, the detailed information is only provided as needed, reducing system overhead, and can be made subject to an additional security check, preventing errors or abuse. Screenshots in FIGS. 6A-6C illustrate purchase order handling.

Operation

Initially, the task list for the lot is created at the ERP system side. Each task is given a projected start date and end date, along with any further information about the task that is necessary for monitoring, including the user assigned to monitor the task, the materials (and supplier) allocated to the task, and the purchase order or other payment information associated with the task. In home construction, the tasks will be ordered according to standard building practices (e.g. foundation first, then framing, wiring, plumbing, insulation, drywall, finishing) with each task broken down into as much detail as is required to ensure proper task completion and timeline monitoring. For example, a task for "wiring" may have completion based on the entire home, but is further broken down into room-by-room completion targets.

Once the information is in the ERP system, the users are responsible for the initial synchronization ("deep" synchronization) with their mobile devices assigned to specific projects, lots and tasks. Alternatively, the devices can be synchronized by the ERP system administrator and then distributed to those users responsible for monitoring and recording progress on the projects, lots and tasks. On a homebuilding project, assigned users typically can include the project manager, construction manager, site superintendent, assistant superintendent and, if desired, salesperson. Different access levels can be provided to different users based on their authority and role within the project organization. For example, all users may have read access to tasks, but only a few are provided with write access, to minimize errors and control access. Access levels can also be set by task, in addition to global user settings.

The user is required to log in from the mobile device, using their assigned ID and password. The ID and password are preferably linked to the hardware PIN to provide additional security. Once logged in, the mobile device is synchronized to the ERP system (on first use and/or dependent on settings, as discussed above) and the user is presented with the summary screen or home screen, based on the user's settings.

The user is then responsible for monitoring the status of ongoing tasks and recording when tasks are started and completed. Changes in the start times for tasks can either be automatically reflected by a changed end time, or subject to manual changes only. When tasks are noted as completed, the individual with sufficient authority settings within the ERP system will exercise an automated payment process for the completed task, which automatically initiates the transfer of funds to the supplier based on payment settings within the ERP system.

Tasks which are delayed or incomplete can have notes appended detailing the reasons for non-completion and delay. This information can then be used to modify the projected end date, possibly modifying other tasks as necessary to maintain the overall lot schedule target. Additionally, this information can later be used in support of delayed or reduced payments that result from missing the original end date.

As each task is linked to a lot and supplier, the contact information for the supplier is also available from the task entry. Thus, the individual is provided with the means to contact the supplier to determine shipment status, or modify schedule delivery times, in accordance with the full task schedule.

Tasks can also be prioritized and flagged, such that a second task cannot be started until the first task is completed using a predecessor process on the ERP system side. Other tasks can be marked optional, if their completion status is not essential to the completion of the overall lot schedule. Tasks can also be frozen, which will preserve the scheduled start and completion date when recalculating the production schedule due to other affected tasks.

While the above system and method has been presented in the context of monitoring the construction of a single lot the method is equally applicable to simultaneous construction of multiple lots on multiple projects and to other building construction.

This concludes the description of a presently preferred embodiment of the invention. The foregoing description has been presented for the purpose of illustration and is not intended to be exhaustive or to limit the invention to the precise form disclosed. It is intended the scope of the invention be limited not by this description but by the claims that follow.

What is claimed is:

1. A system for real-time synchronization of users and materials for one or more homebuilding developments using mobile devices, comprising:
   a) an ERP (Enterprise Resource Planning) system controlling a database containing information for projects and lots, including: lots for completion for each project, tasks for completion for each lot, assignment of suppliers and material to specific tasks, projected and actual times for completion of tasks, contact information for suppliers, and invoicing information for payments of purchase orders upon task completion;
   b) a web server enabling communication between the ERP system and the mobile devices, and enabling the mobile devices to send, receive and change information in the ERP system in real-time;
   c) the mobile devices, as one or more mobile devices assigned to one or more users for real-time tracking and recording of production and work status information for the lots and the tasks and real-time transmission and automatic intermittent sequential synchronization of updated information to and from the ERP system, and also enabling communication with parties assigned to a task directly from a task list or individual task display;
   d) one or more software applications coordinating communication, data transmission, synchronization and security for the mobile devices, the web server and the ERP system;
   wherein the mobile devices are capable of independent operation from the ERP system and do not require a continuous connection to the Internet, the ERP system or the web server.

2. The system of claim 1, wherein the mobile devices are mobile phones.

3. The system of claim 1, wherein the web server is integrated into the ERP system.

4. The system of claim 1, wherein the ERP system is operative to control synchronization with the mobile devices.

5. The system of claim 1, wherein the mobile devices are individually capable of initiating real-time synchronization with the ERP system.

6. The system of claim 1, wherein the ERP system further includes a set of access levels, with each user provided with an access level from said set of access levels that determines said each user's ability to access and modify the database in the ERP system.

7. The system of claim 6, wherein the access level for each user can be set for each task independently of access levels for other tasks.

8. The system of claim 6, wherein the access level for each user includes a setting to indicate that a given user has an access level that permits authorization of payments for completed tasks.

9. The system of claim 8, wherein, in addition to authorization for payments, a user with the authorization access level can initiate an automatic payment process via the ERP once payment for a completed task is authorized.

10. A method of real-time tracking of production schedules and timetables for one or more homebuilding developments, comprising:
   a) assigning one or more mobile devices to one or more users associated with projects and lots, the mobile devices providing access to project and lot information, including: lots for completion for each project, tasks for completion for each lot, assignment of suppliers and material to specific tasks, projected and actual times for completion of tasks, contact information for suppliers and invoicing information for payment of purchase orders upon task completion; and each mobile device capable of operating independently without a continuous connection to a central system;
   b) tracking performance of production tasks for each project via real-time monitoring by the users;
   c) reporting task performance data to a central ERP system and comparing real-time performance of the production tasks to scheduled timetables for the production tasks;

d) enabling modification and updating of scheduled timetables for production tasks based on performance data for the production tasks and additional real-time input from the individuals;

e) coordinating compensation for production activities with the performance data, including enabling payment for completed tasks from the mobile devices via purchase orders;

f) synchronizing automatically, on a sequential basis, updates to scheduled timetables and other information between the mobile devices and the ERP system.

11. The method of claim 10, wherein synchronization is triggered by a request from the mobile device.

12. The method of claim 10, wherein synchronization is automatically triggered at regular intervals of 30 to 480 minutes.

13. The method of claim 10, further including a step of assigning each user an access level from a set of access levels, said access level that determining said each user's ability to access and modify the database in the ERP system.

14. The method of claim 13, wherein the access level for each user can be set for each task independently of access levels for other tasks.

15. The method of claim 13, wherein the access level for each user further includes a setting to indicate that a given user has an access level that permits authorization of payments for completed tasks.

16. The method of claim 15, wherein, in addition to authorization for payments, a user with the authorization access level can initiate an automatic payment process via the ERP once payment for a completed task is authorized.

17. A computer-readable storage medium storing computer-executable instructions for causing a computer system to provide a method of real-time tracking of production schedules and timetables for one or more homebuilding developments, the method comprising:

a) assigning one or more mobile devices to one or more users associated with projects and lots, the mobile devices providing access to project and lot information, including: lots for completion for each project, tasks for completion for each lot, assignment of suppliers and material to specific tasks, projected and actual times for completion of tasks, contact information for suppliers and invoicing information for payment of purchase orders upon task completion; and each mobile device capable of operating independently without a continuous connection to a central system;

b) tracking performance of production tasks for each project via real-time monitoring by the users;

c) reporting task performance data to a central ERP system and comparing real-time performance of the production tasks to scheduled timetables for the production tasks;

d) enabling modification and updating of scheduled timetables for production tasks based on performance data for the production tasks and additional real-time input from the individuals;

e) coordinating compensation for production activities with the performance data, including enabling payment for completed tasks from the mobile devices via purchase orders;

f) synchronizing automatically, on a sequential basis, updates to scheduled timetables and other information between the mobile devices and the ERP system.

18. The computer-readable storage medium of claim 17, wherein synchronization in said method is triggered by a request from the mobile device.

19. The computer-readable storage medium of claim 17, wherein synchronization in said method is automatically triggered at regular intervals of 30 to 480 minutes.

20. The computer-readable storage medium of claim 17, further including in said method a step of assigning each user an access level from a set of access levels, said access level that determining said each user's ability to access and modify the database in the ERP system.

* * * * *